(12) United States Patent
Wertheimer et al.

(10) Patent No.: US 8,949,367 B2
(45) Date of Patent: Feb. 3, 2015

(54) COOPERATIVE STORAGE MANAGEMENT

(75) Inventors: Steven Wertheimer, Kentfield, CA (US); Muthu Olagappan, San Ramon, CA (US); Raymond Guzman, Amherst, NH (US); William Fisher, Concord, MA (US); Anand Beldalker, Banglore (IN); Venky Nagaraja Rao, Belmont, CA (US); Chris Plakyda, Londonderry, NH (US); Debjyoti Roy, Banglore (IN); Senad Dizdar, San Francisco, CA (US)

(73) Assignee: Oracle International Corporation, Redwood Shores, CA (US)

( * ) Notice: Subject to any disclaimer, the term of this patent is extended or adjusted under 35 U.S.C. 154(b) by 58 days.

(21) Appl. No.: 13/286,070

(22) Filed: Oct. 31, 2011

(65) Prior Publication Data
US 2013/0110969 A1    May 2, 2013

(51) Int. Cl.
*G06F 15/167*    (2006.01)
*G06F 11/14*    (2006.01)

(52) U.S. Cl.
CPC ........ *G06F 11/1448* (2013.01); *G06F 11/1458* (2013.01); *G06F 11/1456* (2013.01); *G06F 11/1464* (2013.01)
USPC ............................ 709/216; 375/219; 711/123

(58) Field of Classification Search
CPC ............ G06F 11/1448; G06F 11/1458; G06F 11/1464; G06F 11/1456; G06F 15/167; G06F 12/16; G06F 2201/84; G06F 11/1461; G06F 17/30; G06F 3/0605; G06F 3/0608; G06F 3/0631; G06F 12/02; H04L 67/1097; H04L 41/046; H04L 41/22

USPC ............................ 709/216; 711/123; 375/219
See application file for complete search history.

(56) References Cited

U.S. PATENT DOCUMENTS

| | | | |
|---|---|---|---|
| 5,983,239 A * | 11/1999 | Cannon | 1/1 |
| 6,654,771 B1 | 11/2003 | Parham et al. | |
| 7,330,997 B1 | 2/2008 | Odom | |
| 7,676,510 B1 * | 3/2010 | Karinta | 707/654 |
| 8,112,661 B1 * | 2/2012 | La France et al. | 714/5.1 |
| 2001/0034737 A1 * | 10/2001 | Cane et al. | 707/204 |
| 2004/0167898 A1 | 8/2004 | Margolus et al. | |
| 2004/0260973 A1 * | 12/2004 | Michelman | 714/13 |
| 2005/0038836 A1 * | 2/2005 | Wang | 707/204 |
| 2005/0193236 A1 * | 9/2005 | Stager et al. | 714/6 |
| 2006/0282630 A1 * | 12/2006 | Hochberg et al. | 711/160 |
| 2007/0055833 A1 | 3/2007 | Vu et al. | |
| 2007/0103984 A1 * | 5/2007 | Kavuri et al. | 365/185.17 |
| 2007/0130232 A1 * | 6/2007 | Therrien et al. | 707/204 |

(Continued)

*Primary Examiner* — Anthony Mejia
*Assistant Examiner* — Mehulkumar Shah
(74) *Attorney, Agent, or Firm* — Hickman Palermo Truong Becker Bingham Wong LLP

(57) ABSTRACT

Techniques for cooperative storage management are described. According to embodiments described herein, a storage server stores backup data for a plurality of client systems, including a first client system and one or more other client systems. The storage server receives a request from the first client system to store new backup data. In response to the request from the first client system, the storage server determines which backup data to delete to make space for the new backup data based, at least in part, on retention duration goals associated with the one or more other client systems. The retention duration goals indicate that the client desires to be able to recover data at least as old as a specified age. The storage server may also determine which backup data to delete based, at least in part, on respective minimum space parameter values for the other client systems.

22 Claims, 4 Drawing Sheets

(56) References Cited

U.S. PATENT DOCUMENTS

| | | |
|---|---|---|
| 2007/0136381 A1* | 6/2007 | Cannon et al. ............... 707/200 |
| 2007/0239949 A1* | 10/2007 | Childs et al. ................. 711/162 |
| 2008/0034004 A1* | 2/2008 | Cisler et al. .................. 707/200 |
| 2008/0281883 A1* | 11/2008 | Cannon et al. ............... 707/205 |
| 2008/0307175 A1* | 12/2008 | Hart et al. .................... 711/162 |
| 2009/0276588 A1* | 11/2009 | Murase ......................... 711/160 |
| 2011/0093672 A1* | 4/2011 | Gokhale et al. ............... 711/159 |
| 2013/0024423 A1* | 1/2013 | Doshi et al. .................. 707/640 |
| 2013/0024426 A1* | 1/2013 | Flowers et al. ............... 707/654 |
| 2013/0110783 A1 | 5/2013 | Wertheimer |

* cited by examiner

COOPERATIVE STORAGE MANAGEMENT

CROSS-REFERENCE TO RELATED APPLICATIONS; BENEFIT CLAIM

This application is related to U.S. application. Ser. No. 13/286,106, filed Oct. 31, 2011, entitled "Virtual Full Backups," the entire contents of which is hereby incorporated by reference as if fully set forth herein.

FIELD OF THE INVENTION

The present invention relates generally to storage management and, more specifically, to coordinating shared backup storage space.

BACKGROUND

Data storage devices are subject to data loss from a variety of causes, such as disk failure, unintentional deletion, malicious software attacks, or natural disaster. A common practice to guard against data loss is to create backup copies of important data and store them at a remote storage location. In the event of data loss or corruption, the backup copies are used to restore the lost or corrupted data to a previous state.

Backup storage systems typically allow client systems to restore data within a fixed window of time. The storage system can automatically back up the data at preset intervals of time or immediately log changes to the client system. In enterprise organizations, the large quantity of information and frequent backup intervals often necessitate a great amount of overhead and storage resources.

To reduce costs and simplify manageability, backup resources can be shared between multiple client systems. In one approach, to prevent one or more clients from consuming too many storage resources, each client is assigned a storage quota. The quota acts as a maximum limit, which restricts the amount of data that each client may store. If a particular client system has reached its quota, the client system is required to delete its old backup data before it can store any new backup data.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
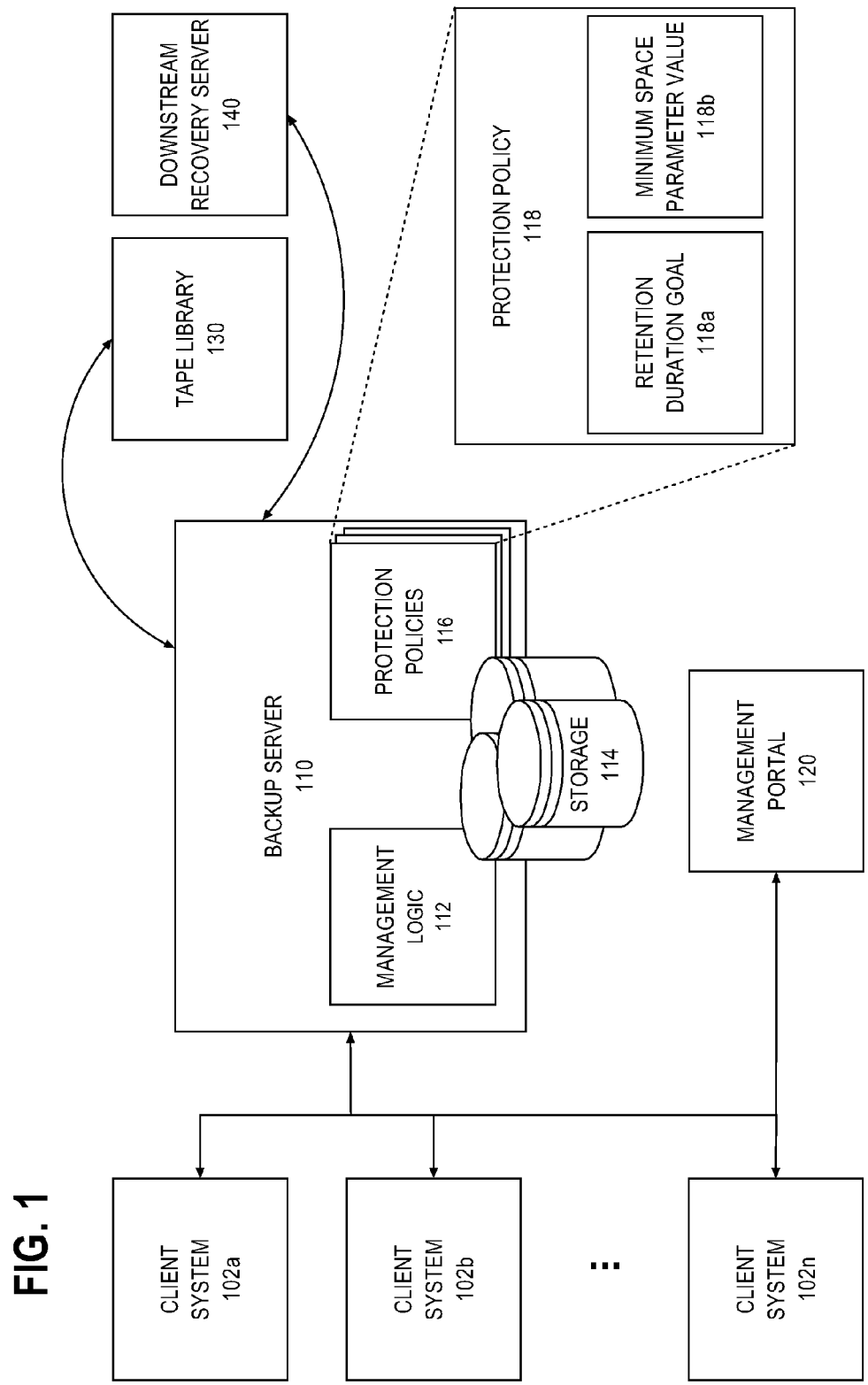
FIG. 1 is a block diagram of a system in which backup storage for multiple clients is managed by a storage system in accordance with an embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are described herein for cooperatively managing backup data for multiple client systems in a manner that allows for more efficient disk usage and better economy of scale. In particular, techniques are provided in which a storage server determines how to phase out backup data based, at least in part, on retention duration goals associated with the client systems. Consequently, the storage server may manage backup storage in such a way as to try and meet each client system's goals.

According to embodiments described herein, a storage server stores backup data for a plurality of client systems, including a first client system and one or more other client systems. The storage server receives a request from the first client system to store new backup data. In response to the request from the first client system, the storage server determines which backup data to delete to make space for the new backup data based not only on the retention duration goals of the first client system that needs more storage, but also on the retention duration goals of one or more other client systems.

The retention duration goals of the first client may indicate, for example, that the first client desires to be able to recover data at least as old as a specified age. The storage server may also determine which backup data to delete based, at least in part, on respective minimum space parameter values for the other client systems.

In addition to retention duration goals, each client system may be guaranteed a minimum amount of space. Thus, even if there is insufficient storage space to meet a particular client system's data retention goal, the storage server will never delete backup data for the particular client system so that it falls bellows the minimum space guaranteed. This allows flexibility for the storage server to work around a client's data retention goal while ensuring a minimum level of performance.

In some embodiments, the storage server manages client systems based on protection policies. The storage server stores a plurality of protection policies, each of which is associated with a distinct set of parameter values, including a retention duration goal and a minimum space parameter value. For each protection policy, the storage server stores a mapping between the protection policy and a set of one or more clients. The storage server determines the respective protection policy associated with a client system based on the mapping and reads the set of parameter values from the respective protection policy to determine the retention duration goal and minimum space parameter value for the client system.

Structural Overview

FIG. 1 is a block diagram of a system in which backup storage for multiple clients is managed by a storage system in accordance with an embodiment. Referring to FIG. 1, system 100 includes client systems 102a to 102n, which store data files that need to be backed up. Client systems 102a to 102n include n number of client systems, where n is a positive integer, that are communicatively coupled to backup server 110. In an example embodiment, client systems 102a to 102n are network hosts that implement the Internet Protocol (IP) and are connected to backup server 110 via a Local Area Network (LAN), a Wide Area Network (WAN), and/or the Internet. Accordingly, client systems 102a to 102n send data, including backup data, to backup server 110 using communication protocol(s) of the IP suite, such as the Hypertext Transfer Protocol (HTTP). The backup data may be sent in a continuous, timing-based, or event-based manner. For example, a client system may send backup data to backup server 110 whenever there is a change to a data file, at periodically scheduled intervals, or in response to a request from backup server 110. The backup data that are sent may vary from implementation to implementation and may include a full backup, incremental backup data, or differential backup data.

Backup server 110 is a storage server configured to receive backup data from client systems 102a to 102n. Backup server 110 includes management logic 112 which manages a pool of backup disk storage, i.e., storage 114, that is shared by client systems 102a to 102n. When backup server 110 receives new backup data from client systems 102a to 102n, management logic 112 determines how to index and store the new backup data in storage 114. If one of client systems 102a to 102n needs to restore data, then the client system submits a recovery request to backup server 110. The recovery request identifies the backup data set desired by the client system to perform the data restore. In response, management logic 112 determines, based on the index, which backup data is part of the requested backup data set and returns the backup data set to the requesting client system.

Backup server 110 includes storage 114, which comprises one or more storage locations in which to store backup data for clients 102a to 102n. Storage 114 may be implemented in a variety of ways. As an example, each storage location of storage 114 can be provisioned as regular filesystems, Automatic Storage Management (ASM) disk groups, and/or web-services storage such as Amazon Simple Storage Service (S3). Backup server 110 may optionally store redundant copies of disk backup data to provide increased data protection. For instance, storage 114 may include a Redundant Array of Independent Disks (RAID) storage system where two or more copies of a backup file are stored, each copy on a different disk.

According to an embodiment, backup server 110 stores protection policies 116. Each of the protection policies is associated with one or more of client systems 102a to 102n and includes a group of attributes that control how backup data is stored and retained by backup server 110. In one embodiment, each protection policy 118 of protection policies 116 specifies a retention duration goal 118a and a minimum space parameter value 118b. Management logic 112 uses protection policies 116 to manage backup data stored for each of the client systems. If management logic 112 determines that some backup data have become obsolete, those backup data will be deleted to reclaim space for newer backup data. Techniques that management logic 112 may use to manage backup data and determine which backup data to delete are described further below.

Management portal 120 is software, or a combination of hardware and software, that enables a user to configure protection policies 116. Management portal 120 may execute on one or more of client systems 102a to 102n, backup server 110, or a separate network host device that is communicatively coupled to backup server 110. A user, such as an administrator, may log onto backup server 110 through management portal 120 to create new protection policies or to access, change, and/or delete existing configuration policies. Accordingly, the user may specify or change the retention duration goal and minimum space parameter value for each protection policy.

Backup server 110 may optionally be coupled to tape library 130 to perform tape archival of backup data. In one embodiment, tape library 130 includes one or more tape drives that are attached directly to backup server 110. Backup server 110 uses the tape drives to migrate backup data from storage 114 to tape. Accordingly, backup server 110 provides automated and centralized tape archival of backup data for one or more of client systems 102a to 102n.

Backup server 110 may optionally be communicatively coupled to downstream backup server 140. In one embodiment, backup data received by backup server 110 is replicated to downstream backup server 140. Downstream backup server 140 may store different protection policies than backup server 110. Accordingly, backup data on downstream backup server 140 may be managed in a much different manner than backup data on backup server 110.

Retention Duration Goals

In one embodiment, the backup server maintains retention duration goals for the client systems that for which the backup server manages backing data. A "retention duration goal" is a goal that specifies, in terms of data age, which backup data a client would like the backup server to retain on disk. Consequently, retention duration goals differ fundamentally from rules that simply allocate specified amounts or percentages of disk space to each client. A retention duration goal may be expressed as a window of time extending backwards from the present (e.g. a client my desire to retain "the most recent five weeks worth" of data).

For example, if client system 102a would like to be able to restore data at any point in time within the past three months, then the backup server would associate a retention duration goal of three months with client system 102a. To meet the goal, backup server 110 would need to retain enough backup data in storage 114 to allow client system 102a to restore data at any point in time within the past three months. In other words, the backup server 110 could delete obsolete backup data for client system 102a that are older than three months, but should retain any backup data that have not become obsolete or that are younger than three months Backup server may associate the same or different retention duration goals for each of client systems 102a to 102n. For instance, client 102b may share the same retention duration goal of three months, have a much shorter retention duration goal, such as two weeks, or have a much longer retention duration goal, such as one year.

The number of backup data sets available within the window of time depends on how backup data is stored for each client system. For example, continuous backup may store backup data sets on the backup server any time a change is made to data on a client system and allow recovery at any point in time within the window. Periodic backups may create a backup data set only at scheduled backup times and only allow recovery at specific checkpoints within the window. Accordingly, the availability of backup data within a particular window may vary from implementation to implementation.

In contrast to a quota, the retention duration goal is merely an objective, because the actual amount of on-disk retention depends on how much disk space exists and the competing needs of other client systems. Thus, the backup server takes the retention duration goal of each client system into consideration when managing backup data, but is not constrained to meet the goal. If enough storage space in storage 114 is available, then backup server 110 will automatically maintain the backup data to meet the data retention goals for every client system. However, the backup server does not guarantee that every client system's data retention goal will be met. If there is insufficient storage space in storage 114 to meet every client system's data retention goals, backup server 110 may delete backup data to a point that falls below one or more client system's retention duration goals. Techniques for deciding which backup data to delete are described further below.

The backup server may also generate notification alarms if the retention duration goal for a particular client is not being met. For example, if the retention duration goal for client system 102a is three months, but the backup server only has enough space to store two months worth of backup data for client system 102a, then the backup server generates an alarm to notify an administrator. Once the notification alarm has been generated, the backup server sends the alarm to the client system associated with the alarm and/or a central management system, such as management portal 120. The notification alarm provides the administrator with notice that the retention duration goal for the particular client is not being met. This information may be useful to the administrator to determine whether the retention duration goals associated with client systems 102a to 102n should be reconfigured or if additional storage space should be added to storage 114.

The retention duration goal for a client system can be specified and changed at any time. If the retention duration goal changes for a particular client, it may affect not only the manner in which the backup server manages data for the particular client, but the manner in which backup server manages other client systems which share backup storage resources. For example, if the retention duration goal for client system 102a changes from three months to one year, then the backup server will begin to store more backup data for client system 102a in storage 114. Because the backup server stores more backup data for client system 102a, there will be less available storage space in storage 114 to store backup data for other client systems 102b to 102n. Accordingly, the allocation of storage resources for these client systems may be diminished. In addition, the manner in which backup data is phased out/deleted will change, as will be apparent from the techniques described below.

Minimum Space Guarantees

The backup server does not guarantee that a client's retention duration goals will be met. However, the backup server may guarantee a minimum amount of storage space will be available for backup storage. In one embodiment, the backup server maintains minimum space parameter values for the client systems that it is backing up. Each minimum space parameter value specifies a minimum space requirement in terms of the amount of space that the backup server reserves or guarantees for an associated client system. This value prevents one runaway client from consuming resources needed by another client system.

In one embodiment, the minimum space parameter value is expressed as a unit of digital information storage. For example, backup server 110 may associate a minimum space parameter value of five terabytes with client system 102a. Alternatively, the minimum space parameter value may be expressed as a percentage of available storage. For instance, instead of a minimum space parameter value of five terabytes, clients system 102a may be associated with a minimum parameter value of one-tenth (or ten percent) of available storage. As long as the sum of all minimum space parameter values for each of the client systems is less than the available disk space, the backup server ensures that it can always accept new backups.

The manner in which the backup server manages backup data may also depend on whether data is being backed up to tape. In one embodiment, when backups are also being migrated to tape, the client system is prevented from exceeding its minimum space parameter value unless backup data that exceeds the minimum space parameter value has been backed up to tape. For purposes of calculating which backup data exceeds the minimum space parameter value, the oldest files are examined first, then the second-oldest, and so forth. Once a client system has consumed its minimum reserved space with backup data that has not been backed up to tape, the backup server refuses new backups for that client system. For example, if client system 102a has a minimum parameter value of five terabytes and has already stored five terabytes of backup data in storage 114, then management logic 112 will prevent client system 102a from storing more backup data in storage 114 until at least some of the backup data has been migrated to tape via tape library 130. This ensures that client systems do not create backups that cannot be purged, when space is needed by other client systems.

Flexible Space Management

Using retention duration goals, business needs regarding backup data may be expressed in terms of time. For example, organizations may specify the amount of backup they would like to store as a function of days, months, or years. However, the organization's backup retention objective must be supported by finite disk space. Unfortunately there is no formula to determine how much disk space is needed to support a particular retention duration objective. The amount of disk needed to satisfy a client's retention duration objective may vary over time based on the number, type, and size of files that are being backed up for the client.

In order to accommodate the incongruity between retention objectives, expressed as a function of time, and the limitations of underlying disk space, the backup server can flexibly manage backup data based on the retention duration goals and the minimum space requirements for each client system. For example, in one embodiment, the backup server attempts to meet each client's backup objectives, as specified by their associated retention duration goal, based on the backup data that is received by the backup server and the amount of available storage space. A retention duration goal will only be compromised when the available disk space for one or more storage locations in storage 114 is unable to support all of the retention duration goals of all clients. In this case, the backup server may delete backup data such that the retention duration goals of one or more client systems will not be met. However, in an embodiment, the backup server will never delete backup data past the minimum space guaranteed to each client system.

In some cases, there may be enough storage available to exceed some or all of the client system's retention duration goals. Thus, to maximize usage of available storage resources, the backup server may permit a client system to store backup data in excess of its associated retention duration goal when there is enough storage space available. For example, assume that client 102a has a retention duration goal of three months, and storage 114 includes obsolete backup data for client 102a that is older than three months. The backup server may allow client 102a to retain this backup data in storage 114 until it is selected for deletion based on the techniques described below.

In some cases, a client system may not generate enough backup data to fill its minimum reserved space. For example client 102a may have a minimum space parameter value of five terabytes, but may not have generated five terabytes of backup data. Although a certain amount of disk space has been guaranteed to client 102a, the backup server can claim unused space for the other client systems 102b to 102n. Thus, the unused portion of five terabytes guaranteed to client system 102a will be used to store backup data for other client systems until client system 102a generates enough backup data to fill the space.

Because the retention duration goal does not perfectly map to a fixed storage space, there may be cases in which the backup data for a particular client system exactly meets or falls below the minimum space guarantee but exceeds the client system's associated retention duration goal. For example, assume that client 102a has a minimum space guarantee of five terabytes and a retention duration goal of three months. In some circumstances, five terabytes of backup data generated by client 102a and stored in storage 114 may provide greater than three months backup for client 102a. If such a scenario occurs, backup server 110 may generate a notification alarm and send it to client 102a and/or management portal 120 to notify an administrator, as the administrator may want to allocate the guaranteed storage resources elsewhere if they are not necessary to meet the client system's goal. However, such overprovisioning may be useful to ensure that backup server 110 can support additional unplanned backups or higher than normal work loads for a particular client. Accordingly, in an alternative embodiment, no notification is generated when overprovisioning occurs. Backup server 110 does not delete backup data below a client's minimum space requirements, even if it exceeds the client's retention duration goal.

In an embodiment, backup server 110 uses the retention duration goals and the minimum space guarantees to prioritize provisioning of storage resources to different classes of clients. For example, clients may be divided into separate classes, where first class clients have higher priority over lower classes of clients. Even though a client has the highest priority level, backup server 110 does not let the client consume all the available storage space. Instead, priority for the client is expressed and determined by a retention duration goal combined with a minimum space guarantee. As long as space is available, backup server 110 determines priority and manages storage 114 to try and meet each of the client's retention duration goals. However, when space is not available, backup server 110 determines priority based on the minimum space guarantees.

Phasing Out Backup Data

Because storage space is finite in nature due to its physical limitations and cost, it is not possible to provide infinite backups for each client system. Consequently, once backup storage has been filled, older backup data must be phased out to make room for newer backup data. In one embodiment, the backup server continuously makes space available for receipt of new backups by deleting obsolete backup data from disk. To determine which backup data to delete in order to make space for the new backup data, the backup server uses the retention duration goals and the minimum space parameter values stored for each client system.

Figure 2A:
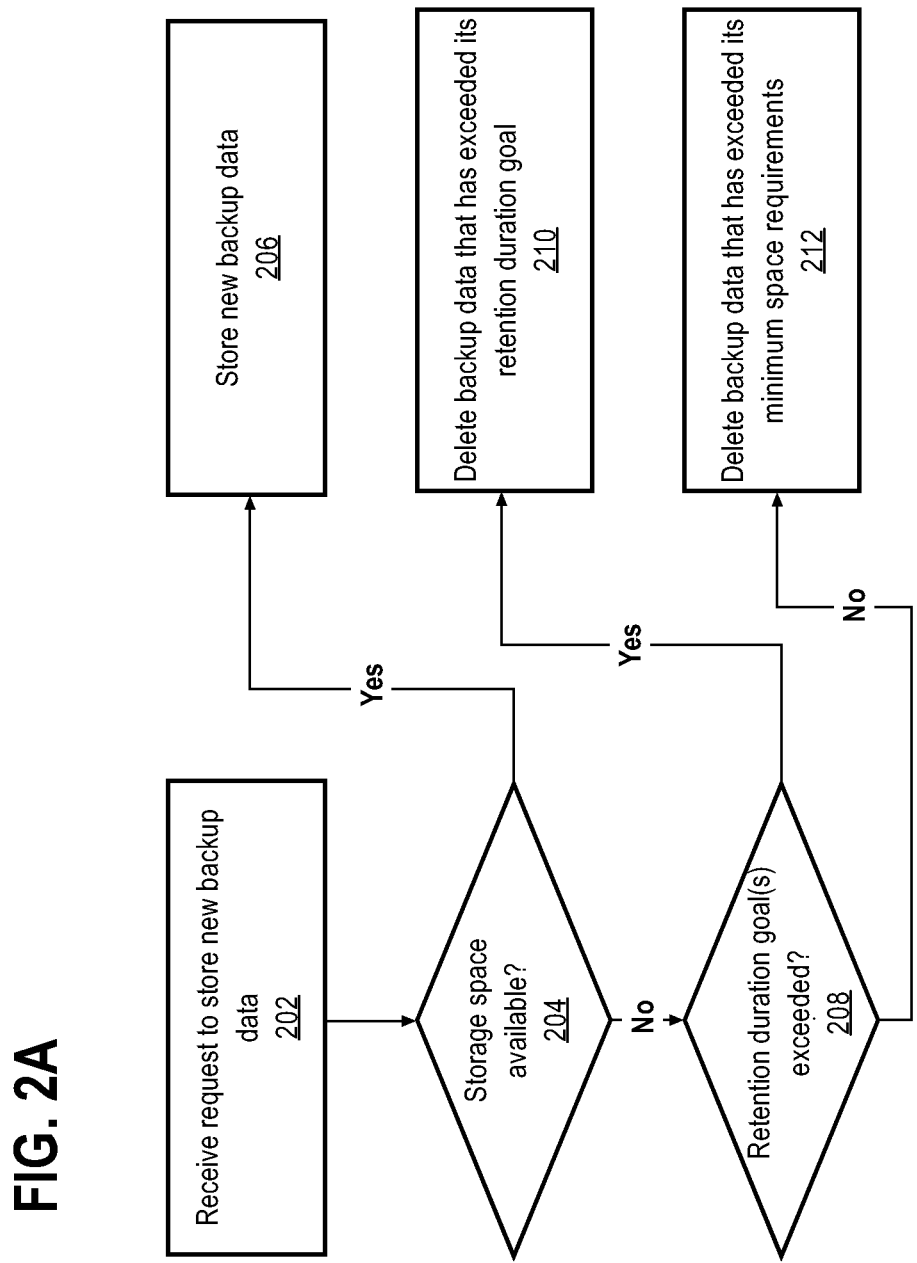
FIG. 2A is a flowchart that illustrates a method for determining which backup data to delete in accordance with an embodiment.

FIG. 2A is a flowchart illustrating a method for deleting backup data in accordance with an embodiment. In step 202, the backup server receives a request to store new backup data from a client system. In step 204, the backup server determines whether there is still storage space available to store the new backup data. If there is sufficient storage available for the new backup data, then in step 206, the backup server stores the data without deleting any backup data. If there is not sufficient space for the new backup data, then the backup server determines, in step 208, whether any client systems have exceeded their associated retention duration goal. If so, then in step 210, the backup server deletes backup data for a client system that has exceeded their retention duration goals. If no client systems have exceeded their retention duration goals, then in step 212, the client system deletes backup data for a client system that has exceeded its minimum space requirements.

Thus, in response to a first client's request to store new backup data, the backup server may delete backup data for a second, different client. This may be the case even if backup data for the first client exceeds the first client's retention duration goals. For example, assume client system 102a requests to store new backup data and that backup server 110 is storing backup data for client system 102a that is older than the retention duration goal for client 102a. In response, backup server 110 may delete backup data for client system 102b or any other client system without deleting any backup data for client 102a, depending on the retention duration goals and/or the minimum space requirements for each of client systems 102a to 102n.

Determining which Backup Data to Delete Based on Retention Duration Goals

In one embodiment, the backup server determines which backup data to delete based on which client system has exceeded their retention duration goal by the greatest amount/percentage. Thus, the backup server takes a top-down approach, deleting backup data as needed based on the retention duration goals until all of the client systems are at or below their goal.

Figure 2B:
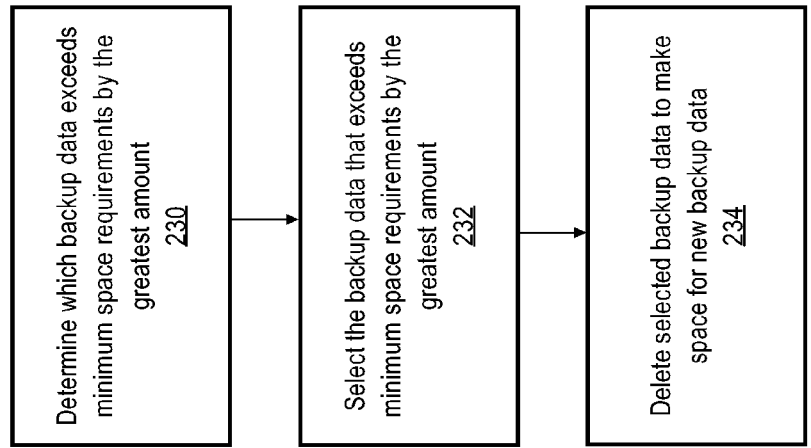
FIG. 2B is a flowchart illustrating a method for determining which backup data to delete based on retention duration goals in accordance with an embodiment.

FIG. 2B is a flowchart illustrating a method for determining which backup data to delete based on retention duration goals in accordance with an embodiment. This method may be performed as part of step 210 of FIG. 2A. In step 220, the backup server determines, among the clients that have exceeded their retention duration goal, which of the clients has associated backup data that exceeds its associated retention duration goal by the greatest amount. In response to the determination of step 220, the backup server selects, in step 222, backup data that has exceeded its retention duration goal by the greatest amount. In step 224, the backup server deletes the selected backup data to make space for the new backup data.

Determining which backup data exceeds its retention duration goal by the greatest amount may vary from implementation to implementation. In one embodiment, the determination is made based on which backup data is older than its goal by the largest percentage of time. For example, assume that client 102a has a retention duration goal of three months and client 102b has a retention duration goal of one year. Further assume that backup server is storing a backup data set for client 102a that is six months old and a backup data set for client 102b that is sixteen months old. In this case, backup server will delete the backup data set for client 102a before the backup data set for client 102b because the backup data set for client 102a exceeds the retention duration goal associated with client 102a by a greater percentage than the backup data set for client 102b exceeds the retention duration goal associated with client 102b.

In an alternative embodiment, the determination is made based on which is older than its retention duration goal by the greatest period of time. In the present example, backup server would delete backup data set for client 102b before the backup data set for client 102a because the backup data set for client 102b has exceeded its retention duration goal by four months whereas the backup data set for client 102a has only exceeded its retention duration goal by three months.

In yet another embodiment, backup data is deleted based on which backup data set exceeds its retention duration goal and consumes the most space. For instance, if backup server 110 is storing multiple backup data sets that are older than their associated retention duration goals, then the backup server determines which of these backup data sets consumes the most space. In response, the backup server selects and deletes the backup data set that consumes the most space to make space for new backup data.

If tape archival is being used for a particular client system, the determination of which backup data to delete may also be based on which backup data has already been backed up to tape. In one embodiment, the backup server deletes backup data that is older than its retention duration goal only if it has already been migrated to tape. For example, assume backup server 110 is configured to migrate backup data for both clients 102a and 102b to tape. If backup server 110 has migrated all backup data for client 102b to tape, but no backup data for client 102a, then the backup server will delete backup data only for client 102b until backup data for client 102a has been migrated to tape.

Determining which Backup Data to Delete Based on Minimum Space Requirements

When no clients have exceeded their retention duration goal, the backup server takes into account the minimum space guarantees for each client system when determining how to delete backup data.

Figure 2C:
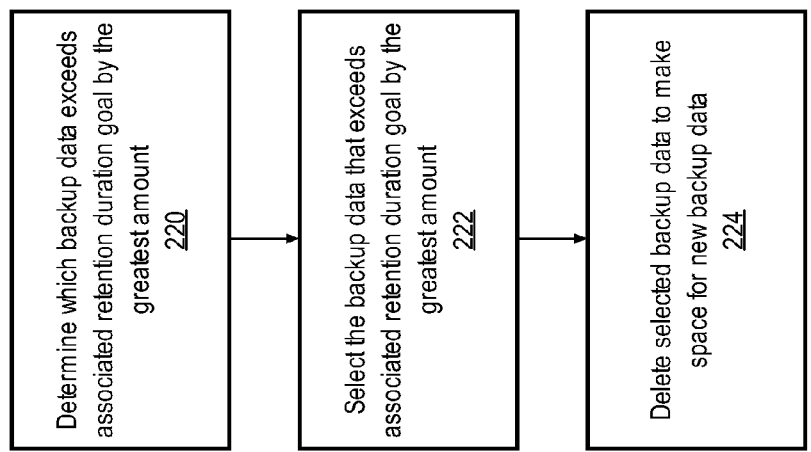
FIG. 2C is a flowchart illustrating a method for determining which backup data to delete based on minimum space parameter requirements in accordance with an embodiment.

In one embodiment, once backup data has been purged from the backup server such that all client systems are at or below their retention duration goal, then the backup server chooses to purge backup data from the client system that has exceeded their minimum space requirements, as specified by the minimum space parameter values, by the greatest amount/percentage. FIG. 2C is a flowchart illustrating a method for determining which backup data to delete based on minimum space parameter values in accordance with an embodiment. This method may be performed as part of set 212 of FIG. 2A. In step 230, the backup server determines, based on the minimum space parameter values associated with each client system, which client system has associated backup data that exceeds a minimum space requirement by the greatest amount. In response to the determination of step 220, the backup server selects, in step 222, backup data that has exceeded the minimum space requirement by the greatest amount. In step 224, the backup server deletes the selected backup data to make space for new backup data.

Determining which backup data exceeds its minimum space requirements by the greatest amount may vary from implementation to implementation. In one embodiment, the determination is made based on which backup data has exceeded its minimum space requirement by the largest percentage. For example, assume that client 102a has a minimum space parameter value of five terabytes and client 102b has a minimum space parameter value of twenty terabytes. Further assume that the backup server is storing backup data for client 102a that consumes ten terabytes and backup data for client 102b that consumes thirty terabytes. In this case, the backup server will delete the backup data for client 102a before the backup data for client 102b because the backup data for client 102a exceeds the minimum space requirement associated with client 102a by a greater percentage than the backup data for client 102b exceeds the minimum space requirement associated with client 102b.

In an alternative embodiment, the determination is made based on which client has exceeded their minimum space requirement by the greatest amount of storage space. In the present example, backup server would delete backup data for client 102b before the backup data for client 102a because client 102b has exceeded its minimum space requirement by ten terabytes whereas client 102a has only exceeded its minimum space requirement by five terabytes.

Policy Based Management

Because the backup server is shared among many client systems, it is likely that a system administrator will want to assign identical attributes to all client systems that need to receive the same class of service. In order to facilitate managing a large group of client systems, the client systems can be grouped on a per policy basis.

For example, the administrator may define a set of one or more protection policies. Each protection policy allows the administrator to specify the detailed attributes just one time, then easily apply them to many different client systems, without re-entering the attribute details for every client system. In one embodiment, each protection policy specifies a retention duration goal and a minimum space parameter value. If the administrator needs to change the detailed attributes, such as the retention duration goal or minimum space parameter value, of a particular class, then the administrator may simply change the parameter once in the protection policy. The change will then be applied to all clients systems associated with the protection policy.

The administrator may also change the protection policy that individual client systems belong to. As an example, a first set of client systems may belong to protection policy A and a second set of client systems may belong to protection policy B. Protection policy A may be configured to provide a lower class of service than protection policy B. For instance, the retention duration goal and minimum space parameter value specified by protection policy A may be less than that specified by protection policy B. If, at any point, a particular client system from the first set needs a better class of service, the administrator may reassign the particular client to protection policy B. Conversely, if a particular client system from the second set does not need the class of service offered by protection policy B, the administrator may assign the client system to protection policy A. Once reassigned, the backup server will manage the client particular system based on the attributes of their newly associated protection policy.

In an embodiment, the backup server stores a mapping between a set of one or more client systems and each protection policy, where each client system is controlled by exactly one protection policy. The mapping may be indexed by client and/or by protection policy. The backup server uses the mapping to determine the protection policy associated with each client system and its backup data. Once the backup server has determined the protection policy for a client system, the backup server can read the protection policy to determine the client system's attributes, such as the retention duration goal and the minimum space parameter value.

In an embodiment, different backup server may store different protection policies for each client system. For example, backup server 110 may associated client 102a with protection policy A, which specifies a data retention goal of one year and a minimum space guarantee of five terabytes. Downstream backup server 140 may associate client 102a with protection policy B, which specifies a data retention goal of six months and a minimum space guarantee of one terabyte. Accordingly, backup server 110 manages backup data for client 102a according to protection policy A, while downstream backup server 140 manages backup data for client 102a according to protection policy B. Therefore, the amount of backup data stored for client 102a at a given point in time may differ greatly between backup server 110 and downstream backup server 140.

Grouping by Storage Location

In an embodiment, storage 114 comprises multiple storage locations. The storage locations may include, without limitation, ASM diskgroups, O/S directories, web-services storage offerings, such as Amazon S3, or any other suitable storage medium. Backup server 110 assigns each client to one storage location within storage 114. The storage location may be specified in a client's protection policy or through any other suitable mechanism.

In an embodiment, at least some of the storage locations are shared by two or more clients. Backup server 110 manages a particular storage location based on the minimum space guarantee and retention duration goals of each client assigned to the particular storage location according to the techniques described above. Thus, determining how to cooperatively manage backup storage and which backup data to delete is done on a per-storage location basis. In other words, a first client's backup storage at a first storage location may affect a second client's backup storage at the first storage location, but does not affect a second client's backup storage at a second storage location. Grouping clients by storage location in this manner provides an organization or other entity an option of cooperatively sharing storage resources only within a department or some other logical grouping. Storage across different departments or other groupings may be insulated from each other.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 3:
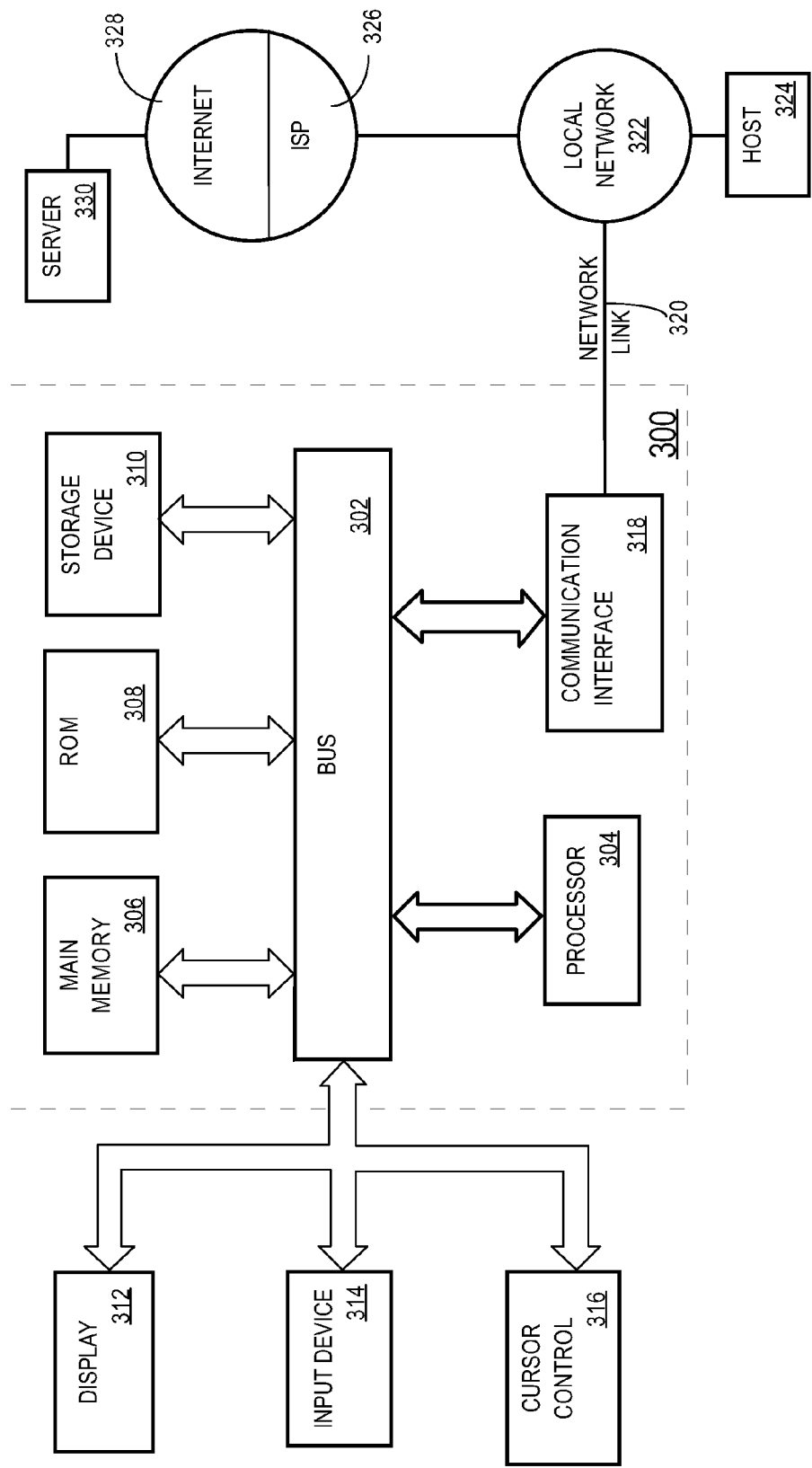
FIG. 3 is a block diagram of a computer system upon which embodiments of the invention may be implemented.

For example, FIG. 3 is a block diagram that illustrates a computer system 300 upon which an embodiment of the invention may be implemented. Computer system 300 includes a bus 302 or other communication mechanism for communicating information, and a hardware processor 304 coupled with bus 302 for processing information. Hardware processor 304 may be, for example, a general purpose microprocessor.

Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Such instructions, when stored in non-transitory storage media accessible to processor 304, render computer system 300 into a special-purpose machine that is customized to perform the operations specified in the instructions.

Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

Computer system 300 may implement the techniques described herein using customized hard-wired logic, one or more ASICs or FPGAs, firmware and/or program logic which in combination with the computer system causes or programs computer system 300 to be a special-purpose machine. According to one embodiment, the techniques herein are performed by computer system 300 in response to processor 304 executing one or more sequences of one or more instructions contained in main memory 306. Such instructions may be read into main memory 306 from another storage medium, such as storage device 310. Execution of the sequences of instructions contained in main memory 306 causes processor 304 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 310. Volatile media includes dynamic memory, such as main memory 306. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 302. Transmission media can also take the form of acoustic or light waves, such as those generated during radio-wave and infra-red data communications.

Various forms of media may be involved in carrying one or more sequences of one or more instructions to processor 304 for execution. For example, the instructions may initially be carried on a magnetic disk or solid state drive of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card, cable modem, satellite modem, or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are example forms of transmission media.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
    storing, by a storage server comprising one or more processors, backup data for a plurality of client systems;
    wherein the plurality of client systems includes a first client system and one or more other client systems;
    wherein the one or more other client systems includes at least a second client system;
    wherein the first client system is associated with a first retention duration goal;
    wherein the first retention duration goal indicates that the first client system desires to be able to recover data at least as old as a first specified data age;
    wherein the storage server does not guarantee that the first retention duration goal will be met;
    wherein the second client system is associated with a second retention duration goal;
    wherein the second retention duration goal indicates that the second client system desires to be able to recover data at least as old as a second specified data age;
    wherein the storage server does not guarantee that the second retention duration goal will be met;
    receiving, at the storage server, a request from the first client system to store new backup data for the first client system; and
    in response to the request from the first client system, the storage server determining which backup data to delete to make space for the new backup data based, at least in part, on the second retention duration goal associated with the second client system;
    wherein determining which backup data to delete to make space for the new backup data of the first client system includes determining to delete an amount of backup data associated with the second client system that is newer than the second specified data age, while retaining at least a guaranteed amount of backup data for the second client system.

2. The method of claim 1,
    wherein determining which backup data to delete to make space for the new backup data is further based, at least in part, on the first retention duration goal and a first minimum space parameter value.

3. The method of claim 1, wherein the backup data to delete is backup data for the second client system, the method further comprising deleting the backup data for the second client system from storage associated with the storage server.

4. The method of claim 1, wherein determining which backup data to delete to make space for the new backup data based, at least in part, on the second retention duration goal associated with the second client system comprises:
    selecting backup data to delete based on which backup data have exceeded retention duration goals associated with the plurality of client systems;
    if none of the backup data have exceeded the retention duration goals associated with the plurality of client systems, then selecting backup data to delete based on minimum space requirements for each of the one or more other client systems.

5. The method of claim 1, wherein determining which backup data to delete to make space for the new backup data based, at least in part, on the second retention duration goal associated with the second client system comprises:
- determining which backup data set for the one or more other client systems is older than a retention duration goal by a greatest percentage of time;
- in response to said determining, deleting some or all backup data from the backup data set that is older than a retention duration goal by the greatest percentage of time.

6. The method of claim 1, wherein determining which backup data to delete to make space for the new backup data based, at least in part, on the second retention duration goal associated with the second client system comprises:
- determining which backup data set for the one or more other client systems is older than a retention duration goal by a greatest period of time;
- in response to said determining, deleting some or all data from the backup data set that is older than a retention duration goal by the greatest period of time.

7. The method of claim 1, wherein determining which backup data to delete to make space for the new backup data based, at least in part, on the second retention duration goal associated with the second client system comprises:
- determining which backup data set for the one or more other client systems is older than a retention duration goal and consumes a greatest amount of space;
- in response to said determining, deleting some or all backup data from the backup data set that is older than a retention duration goal and consumes the greatest amount of space.

8. The method of claim 1, wherein determining which backup data to delete to make space for the new backup data based, at least in part, on the second retention duration goal associated with the second client system comprises:
- determining which backup data set for the one or more other client systems exceeds a minimum space requirement by a greatest amount;
- in response to said determining, deleting some or all backup data from the backup data set that exceeds the minimum space requirement by the greatest amount.

9. The method of claim 1, further comprising:
- storing a plurality of protection policies, wherein each protection policy of the plurality of protection policies is associated with a distinct retention duration goal;
- storing a mapping between each respective client system of the plurality of client systems and a respective one protection policy of the plurality of protection policies;
- determining the respective protection policy associated with each respective client system of the plurality of client systems based on the mapping;
- reading the respective protection policy to determine a retention duration goal for said each client system.

10. The method of claim 1, the method further comprising:
- in response to the request from the first client:
  - deleting second backup data for the second client system;
  - storing the new backup data for the first client system without deleting any backup data for the first client system;
  - wherein backup data stored by the storage server for the first client system is older than the first specified data age of the first retention duration goal associated with the first system.

11. The method of claim 1,
- wherein backup data for a third client system consume less space than a minimum space requirement for the third client system;
- wherein backup data for the first client system exceed the first specified data age of the first retention duration goal associated with the first client system, the method further comprising:
- in response to the request from the first client system, using unclaimed storage space associated with the third client system to store first backup data for the first client system;
- wherein the new backup data for the first client system is stored without deleting backup data for the first client system.

12. A non-transitory computer-readable medium storing instructions, which, when executed by one or more processors, cause one or more computing devices to perform operations comprising:
- storing, by a storage server comprising one or more processors, backup data for a plurality of client systems;
- wherein the plurality of client systems includes a first client system and one or more other client systems;
- wherein the one or more other client systems includes at least a second client system;
- wherein the first client system is associated with a first retention duration goal;
- wherein the first retention duration goal indicates that the first client system desires to be able to recover data at least as old as a first specified data age;
- wherein the storage server does not guarantee that the first retention duration goal will be met;
- wherein the second client system is associated with a second retention duration goal;
- wherein the second retention duration goal indicates that the second client system desires to be able to recover data at least as old as a second specified data age;
- wherein the storage server does not guarantee that the second retention duration goal will be met;
- receiving, at the storage server, a request from the first client system to store new backup data for the first client system; and
- in response to the request from the first client system, the storage server determining which backup data to delete to make space for the new backup data based, at least in part, on the second retention duration goal associated with the second client system;
- wherein determining which backup data to delete to make space for the new backup data of the first client system includes determining to delete an amount of backup data associated with the second client system that is newer than the second specified data age, while retaining at least a guaranteed amount of backup data for the second client system.

13. The non-transitory computer-readable medium of claim 12,
- wherein determining which backup data to delete to make space for the new backup data is further based, at least in part, on the first retention duration goal and a first minimum space parameter value.

14. The non-transitory computer-readable medium of claim 12, wherein the backup data to delete is backup data for the second client system, wherein the instructions further cause the one or more computing devices to perform operations comprising deleting the backup data for the second client system from storage associated with the storage server.

15. The non-transitory computer-readable medium of claim 12, wherein determining which backup data to delete to make space for the new backup data based, at least in part, on the second retention duration goal associated with the second client system comprises:

selecting backup data to delete based on which backup data have exceeded retention duration goals associated with the plurality of client systems;

if none of the backup data have exceeded the retention duration goals associated with the plurality of client systems, then selecting backup data to delete based on minimum space requirements for each of the one or more other client systems.

16. The non-transitory computer-readable medium of claim 12, wherein determining which backup data to delete to make space for the new backup data based, at least in part, on the second retention duration goal associated with the second client system comprises:

determining which backup data set for the one or more other client systems is older than a retention duration goal by a greatest percentage of time;

in response to said determining, deleting some or all data from the backup data set that is older than a retention duration goal by the greatest percentage of time.

17. The non-transitory computer-readable medium of claim 12, wherein determining which backup data to delete to make space for the new backup data based, at least in part, on the second retention duration goal associated with the second client system comprises:

determining which backup data set for the one or more other client systems is older than a retention duration goal by a greatest period of time;

in response to said determining, deleting some or all backup data from the backup data set that is older than a retention duration goal by the greatest period of time.

18. The non-transitory computer-readable medium of claim 12, wherein determining which backup data to delete to make space for the new backup data based, at least in part, on the second retention duration goal associated with the second client system comprises:

determining which backup data set for the one or more other client systems is older than a retention duration goal and consumes a greatest amount of space;

in response to said determining, deleting some or all backup data from the backup data set that is older than a retention duration goal and consumes the greatest amount of space.

19. The non-transitory computer-readable medium of claim 12, wherein determining which backup data to delete to make space for the new backup data based, at least in part, on the second retention duration goal associated with the second client system comprises:

determining which backup data set for the one or more other client systems exceeds a minimum space requirement by a greatest amount;

in response to said determining, deleting some or all backup data from the backup data set that exceeds the minimum space requirement by the greatest amount.

20. The non-transitory computer-readable medium of claim 12, wherein the instructions further cause the one or more computing devices to perform operations comprising:

storing a plurality of protection policies, wherein each protection policy of the plurality of protection policies is associated with a distinct retention duration goal;

storing a mapping between each respective client system of the plurality of client systems and a respective one protection policy of the plurality of protection policies;

determining the respective protection policy associated with each respective client system of the plurality of client systems based on the mapping;

reading the respective protection policy to determine a retention duration goal for said each client system.

21. The non-transitory computer-readable medium of claim 12, wherein the instructions further cause the one or more computing devices to perform operations comprising:

in response to the request from the first client:

deleting second backup data for the second client system;

storing the new backup data for the first client system without deleting any backup data for the first client system;

wherein backup data stored by the storage server for the first client system is older than the first specified data age of the first retention duration goal associated with the first system.

22. The non-transitory computer-readable medium of claim 12, wherein backup data for a third client system consume less space than a minimum space requirement for the third client system;

wherein backup data for the first client system exceed the first specified data age of the first retention duration goal associated with the first client system, the instructions further causing the one or more computing devices to perform operations comprising:

in response to the request from the first client system, using unclaimed storage space associated with the third client system to store first backup data for the first client system;

wherein the new backup data for the first client system is stored without deleting backup data for the first client system.

* * * * *

UNITED STATES PATENT AND TRADEMARK OFFICE
CERTIFICATE OF CORRECTION

| | | |
|---|---|---|
| PATENT NO. | : 8,949,367 B2 | Page 1 of 1 |
| APPLICATION NO. | : 13/286070 | |
| DATED | : February 3, 2015 | |
| INVENTOR(S) | : Steven Wertheimer et al. | |

It is certified that error appears in the above-identified patent and that said Letters Patent is hereby corrected as shown below:

In the Specification

Column 4:
Line 50: Delete "months" and insert --months.--

Signed and Sealed this
Fourth Day of August, 2015

Michelle K. Lee
*Director of the United States Patent and Trademark Office*